(12) United States Patent
Wichary et al.

(10) Patent No.: US 12,333,278 B2
(45) Date of Patent: Jun. 17, 2025

(54) INTERFACE OBJECT MANIPULATION BASED ON AGGREGATED PROPERTY VALUES

(71) Applicant: Figma, Inc., San Francisco, CA (US)

(72) Inventors: Marcin Wichary, San Francisco, CA (US); Jonas Sicking, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 17/169,267

(22) Filed: Feb. 5, 2021

(65) Prior Publication Data

US 2021/0247967 A1    Aug. 12, 2021

Related U.S. Application Data

(60) Provisional application No. 62/971,207, filed on Feb. 6, 2020.

(51) Int. Cl.
*G06F 8/34*     (2018.01)
*G06F 3/0484*   (2022.01)
(Continued)

(52) U.S. Cl.
CPC ............ *G06F 8/34* (2013.01); *G06F 3/04842* (2013.01); *H04L 67/02* (2013.01)

(58) Field of Classification Search
CPC .... G06F 8/34; G06F 3/04842; G06F 3/04845; G06F 8/20; G06F 8/38; H04L 67/02
See application file for complete search history.

(56) References Cited

U.S. PATENT DOCUMENTS

| 5,634,095 A | 5/1997 | Wang |
| 5,760,788 A | 6/1998 | Chainini |

(Continued)

FOREIGN PATENT DOCUMENTS

| CN | 108280865 | 12/2017 |
| CN | 111602192 | 8/2020 |

(Continued)

OTHER PUBLICATIONS

International Search Report and the Written Opinion of the International Searching Authority mailed Jan. 17, 2021, for related PCT/US2020/060300 filed Nov. 12, 2020, 13 pages.

(Continued)

*Primary Examiner* — Andrew T McIntosh
(74) *Attorney, Agent, or Firm* — Squire Patton Boggs LLP; Sarah Mirza

(57) ABSTRACT

A network computer provides interactive graphic design system instructions to a user computing device, causing the user computing device to render a design interface and provide an input interface at the user computing device. The user computing device interprets an input action, the input action comprising selecting a selection of a plurality of objects using the input interface. For a property, the user computing device identifies a set of one or more property values corresponding to the property for objects in the plurality of objects. The user computing device displays the set of one or more property values. The user computing device receives user input specifying a selected property value and user input specifying a new value for the selected property value. The user computing device updates the property for each object of the plurality of objects having the selected property value to reflect the new value.

18 Claims, 9 Drawing Sheets

(51) Int. Cl.
*G06F 3/04842* (2022.01)
*G06F 17/00* (2019.01)
*H04L 67/02* (2022.01)

(56) References Cited

U.S. PATENT DOCUMENTS

| | | | |
|---|---|---|---|
| 5,862,372 | A | 1/1999 | Morris |
| 6,049,628 | A | 4/2000 | Chen |
| 7,516,406 | B1 | 4/2009 | Cameron |
| 7,752,559 | B1 | 7/2010 | Szpak |
| 7,752,563 | B2 | 7/2010 | Ice |
| 8,312,416 | B2 | 11/2012 | Freund |
| 8,370,757 | B2 | 2/2013 | Tinari |
| 8,612,849 | B2 | 12/2013 | Boreham |
| 8,972,879 | B2 | 3/2015 | Migos |
| 9,430,229 | B1 | 8/2016 | Zijst |
| 9,772,682 | B1 * | 9/2017 | Meenakshisundaram ............. G06F 9/451 |
| 10,114,733 | B1 | 10/2018 | Varghese |
| 10,181,059 | B1 | 1/2019 | Brewton |
| 10,181,223 | B2 | 1/2019 | Stanley |
| 10,268,525 | B2 * | 4/2019 | Beckett ............. G06F 9/541 |
| 10,606,925 | B2 | 3/2020 | O'Donovan |
| 10,809,898 | B2 | 10/2020 | Winnemoeller |
| 10,902,567 | B2 | 1/2021 | Mertens |
| 10,997,217 | B1 | 5/2021 | Nielsen |
| 11,126,412 | B2 | 9/2021 | Kuwamoto |
| 11,934,807 | B2 | 3/2024 | Kuwamoto |
| 2002/0032554 | A1 | 3/2002 | Nakagawa |
| 2003/0004724 | A1 | 1/2003 | Kahn |
| 2005/0094206 | A1 | 5/2005 | Tonisson |
| 2005/0144571 | A1 | 6/2005 | Loverin |
| 2006/0119738 | A1 | 6/2006 | Kido |
| 2006/0136844 | A1 | 6/2006 | Zhang |
| 2007/0061716 | A1 | 3/2007 | Kato |
| 2008/0282188 | A1 | 11/2008 | Hays |
| 2008/0303819 | A1 | 12/2008 | Latour |
| 2011/0266426 | A1 | 11/2011 | Kikuchi |
| 2012/0042242 | A1 | 2/2012 | Garland |
| 2012/0113106 | A1 | 5/2012 | Choi |
| 2012/0124492 | A1 | 5/2012 | Taron |
| 2013/0050238 | A1 | 2/2013 | Bergou |
| 2013/0055126 | A1 | 2/2013 | Jackson et al. |
| 2013/0120368 | A1 * | 5/2013 | Miller ............. G06T 19/00 345/419 |
| 2013/0187922 | A1 | 7/2013 | Sexton |
| 2013/0232403 | A1 | 9/2013 | Abrahami |
| 2013/0329129 | A1 | 12/2013 | Gupta et al. |
| 2014/0072281 | A1 | 3/2014 | Cho |
| 2014/0125671 | A1 | 5/2014 | Vorobyov |
| 2014/0310660 | A1 | 10/2014 | Rosen |
| 2014/0351110 | A1 * | 11/2014 | Lidor ............. G06F 8/34 705/37 |
| 2015/0092228 | A1 * | 4/2015 | Okabayashi ......... G03G 15/502 358/1.15 |
| 2015/0105875 | A1 | 4/2015 | Tran |
| 2015/0160838 | A1 | 6/2015 | Shirabe |
| 2015/0242099 | A1 | 8/2015 | Wallace |
| 2016/0048388 | A1 | 2/2016 | Eksten |
| 2016/0124599 | A1 | 5/2016 | Joo |
| 2016/0246899 | A1 | 8/2016 | Hirschtick |
| 2016/0342315 | A1 | 11/2016 | Jaramillo |
| 2017/0046317 | A1 | 2/2017 | Geva |
| 2017/0186241 | A1 | 6/2017 | Zavesky |
| 2017/0199652 | A1 * | 7/2017 | Campbell ............. G06F 3/0482 |
| 2017/0285913 | A1 | 10/2017 | Young |
| 2017/0293592 | A1 * | 10/2017 | He ............. G06F 40/106 |
| 2017/0337321 | A1 | 11/2017 | Hoford |
| 2018/0136827 | A1 * | 5/2018 | Bae ............. G06F 3/04817 |
| 2018/0173406 | A1 * | 6/2018 | Hill ............. G06F 3/0481 |
| 2018/0217965 | A1 | 8/2018 | Sasikumar |
| 2019/0102072 | A1 | 4/2019 | Strinden |
| 2019/0114817 | A1 * | 4/2019 | Kerr ............. G06F 40/174 |
| 2019/0325626 | A1 * | 10/2019 | Tao ............. G06T 11/60 |
| 2019/0369822 | A1 * | 12/2019 | Tzeng ............. G06F 3/0481 |
| 2020/0233624 | A1 * | 7/2020 | Peng ............. G06F 3/14 |
| 2020/0363943 | A1 * | 11/2020 | Millington ............. G06F 3/0416 |
| 2020/0371753 | A1 | 11/2020 | Dhawal |
| 2020/0371758 | A1 | 11/2020 | Kuwamoto |
| 2021/0097065 | A1 * | 4/2021 | Beers ............. G06F 16/248 |
| 2021/0141515 | A1 | 5/2021 | Wichary |
| 2021/0142547 | A1 * | 5/2021 | Fessler, Jr. ............. G06T 11/001 |
| 2021/0349701 | A1 | 11/2021 | Kuwamoto |
| 2022/0083316 | A1 | 3/2022 | Andersson |
| 2022/0129142 | A1 | 4/2022 | Wichary |
| 2022/0156422 | A1 | 5/2022 | Kuwamoto |
| 2024/0220218 | A1 | 7/2024 | Kuwamoto |

FOREIGN PATENT DOCUMENTS

| | | |
|---|---|---|
| EP | 0576178 | 12/1993 |
| EP | 2775397 A2 | 9/2014 |
| EP | 3293619 | 3/2018 |
| EP | 3633472 A1 | 4/2020 |
| EP | 3933777 | 1/2022 |
| WO | WO2009/0132444 | 11/2009 |
| WO | WO-2009/132444 A1 | 11/2009 |
| WO | WO2019/0125448 | 6/2019 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

International Search Report and the Written Opinion of the International Searching Authority mailed May 21, 2021, for related PCT/US2021/017093 filed Feb. 8, 2021, 16 pages.

Tutorialspoint.com: "Microsoft Visio Themes and Styles", Nov. 30, 2018, XP055801565, Retrieved from the Internet: URL: https://web.archive.org/web/20181130054605/https://www.tutorialspoint.com/microsoft_visio/microsoft_visio_themes_styles.htm [retrieved on May 5, 2021]; 3 pages.

International Search Report and the Written Opinion of the International Searching Authority mailed Dec. 22, 2021, for related PCT/US2021/050734 filed Sep. 16, 2021, 66 pages.

International Search Report and the Written Opinion of the International Searching Authority mailed Feb. 23, 2022, for related PCT/US2021/059987 filed Nov. 18, 2021, 12 pages.

IBM: "IBM VisualAge for Java, Version 3.5 - Visual Compisition", 2000, pp. 1-253, XP055890198, Retrieved from the Internet: URL:http://www.inf.fu-berlin.de/inst/ag-db/software/VAJ_PDF/jvbpdf.pdf [retrieved onFeb. 10, 2022] section titled "Layout managers in visual composition" at pp. 14-17 section titled "Setting a layout manager during visual composition" at p. 60 first paragraph of the section titled "Null Layout" at p. 17.

International Search Report and the Written Opinion of the International Searching Authority mailed Jul. 1, 2022, for related PCT/US2022/025626 filed Apr. 20, 2022, 17 pages.

Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.

Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.

International Search Report and the Written Opinion of the International Searching Authority mailed Jul. 25, 2022, for related PCT/US2022/025840 filed Apr. 201, 2022, 17 pages.

Paper by WeTransfer—Simple Sketch App, "Creativity at your fingertips" URL:https://web.archive.org/web/20220121205009/https://wetransfer.com/paper, 9 pages.

Jarzabek et al., "XVCL: XML-based Variant Configuration Language", IEEE, pp. 1-2 (Year: 2003).

Kriouile et al., "Towards Flexible and Reusable SaaS for Multi-tenancy", IEEE, pp. 1-7 (Year: 2014).

W. Michael, "Synchronize Numberic Controls on Different Tabs in LabVIEW," Feb. 7, 2010: https://forums.ni.com/t5/example-code/

(56) References Cited

OTHER PUBLICATIONS synchronize-numeric-controls-on-different-tabs-in-labview/ta-p/3516734, retrieved May 11, 2023, 3 pages.
Final Office Action Dated Feb. 9, 2021, for U.S. Appl. No. 16/883,002. 17 pages.
LabVIEW Advantage, "How To Use Single Property Node for N No. of Controls in LabVIEW," Mar. 18, 2018, https://www.youtube.com/watch?v=nCvMLB_kH4Q, retrieved May 11, 2023.
Non-Final Office Action Dated Apr. 27, 2023, for U.S. Appl. No. 17/384,578. 22 pages.
Non-Final Office Action Dated Oct. 13, 2020, for U.S. Appl. No. 16/883,002. 14 pages.
Notice of Allowance Dated May 24, 2021, for U.S. Appl. No. 16/883,002. 8 pages.
Notice of Allowance Dated Nov. 6, 2023, for U.S. Appl. No. 17/384,578. 8 pages.
The International Searching Authority, "Search Report" in application No. PCT/US2020/034503, dated Jul. 2020, 4 pages.
Helmers: Microsoft Visio 2016 step by step, Chapter 9, chapter 13, Dec. 22, 2015.
Emery: "How to Automatically Color-Code Specific Words or Phrases in Excel", Nov. 8, 2012.
Orgchart Professional: Orgchart Conditional Formatting, Apr. 21, 2015.
Anonymous: "Color Shapes according to their data—Visio", Aug. 3, 2020.
Office Action dated Jun. 6, 2024 in EP 21 709 289.9 8 pages.

* cited by examiner

US 12,333,278 B2

INTERFACE OBJECT MANIPULATION BASED ON AGGREGATED PROPERTY VALUES

CROSS-REFERENCE TO RELATED APPLICATION

This application claims the benefit of priority to U.S. Provisional Application No. 62/971,207, filed Feb. 6, 2020; the aforementioned priority application being hereby incorporated by reference in its entirety.

TECHNICAL FIELD

Examples described herein generally relate to a network computer system, and relate more specifically to interactive graphic design systems.

BACKGROUND

Software design tools have many forms and applications. In the realm of application user interfaces, for example, software design tools require designers to blend functional aspects of a program with aesthetics and even legal requirements, resulting in a collection of pages that form the user interface of an application. For a given application, designers often have many objectives and requirements that are difficult to track.

DETAILED DESCRIPTION

Figure 1A:
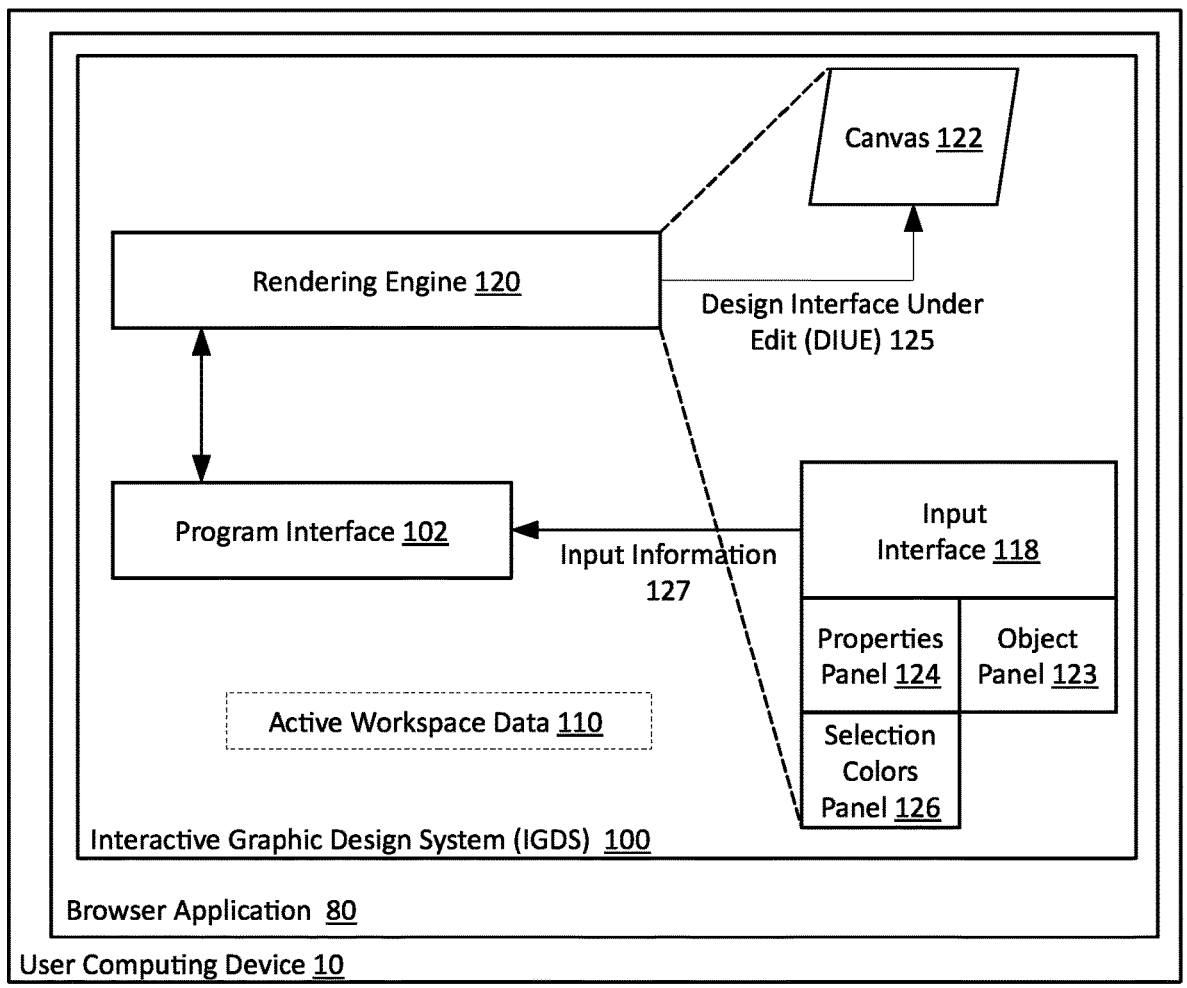
FIG. 1A illustrates an interactive graphic design system for a computing device of a user, according to one or more examples.

Examples include a computing system that can operate to implement an interactive graphic design system that enables design interface object manipulation based on aggregated property values. In one or more examples, a computer system is configured to implement an interactive graphic design system for designers, such as user interface designers ("UI designers"), web designers, and web developers. Among other advantages, examples allow users to more conveniently view, select, and/or edit objects based on a shared property value of the objects, such as a specific style or a specific color.

According to some examples, a computing device operates to receive workspace data describing a design interface, render the design interface for display to a user, and provide an input interface for the user. The computing device interprets an input action that includes the user selecting a selection of a plurality of objects using the input interface. For a property, the computing device identifies a set of one or more property values corresponding to the property for objects in the plurality of objects. The computing device displays the set of one or more property values on the input interface, receives user input specifying a selected property value of the set of one or more property values, and receives user input specifying a new value for the selected property value. The computing device updates the property for each object of the plurality of objects having the selected property value to reflect the new value.

Still further, in some examples, a network computer system is provided to include memory resources store a set of instructions, and one or more processors are operable to communicate the set of instructions to a plurality of user devices. The set of instructions can be communicated to user computing devices, in connection with the user computing devices being operated to render a corresponding design interface on a canvas, where the design interface can be edited by user input that is indicative of any one of multiple different input actions. The set of instructions can be executed on the computing devices to cause each of the computing devices to determine one or more input actions to perform based on user input. The instructions may further cause the user computing devices to modify the design interface based on one or more input actions.

In some examples, for at least a first computing device, the instructions can be executed to cause the computing device to: receive workspace data describing a design interface, render the design interface for display to a user, and provide an input interface for the user. The computing device interprets an input action that includes the user selecting a selection of a plurality of objects using the input interface. For a property, the computing device identifies a set of one or more property values corresponding to the property for objects in the plurality of objects. The computing device displays the set of one or more property values on the input interface, receives user input specifying a selected property value of the set of one or more property values, and receives user input specifying a new value for the selected property value. The computing device updates the property for each object of the plurality of objects having the selected property value to reflect the new value.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices, and/or tablets), and magnetic memory. Computers, terminals, network-enabled devices (e.g., mobile devices, such as cell phones) are all examples of machines and devices that utilize processors, memory, and instructions stored on computer-readable mediums. Additionally, embodiments may be implemented in the form of computer-programs, or a computer-usable carrier medium capable of carrying such a program.

System Overview

FIG. 1A illustrates an interactive graphic design system for a computing device of a user, according to one or more examples. An interactive graphic design system (IGDS) 100 can be implemented in any one of multiple different computing environments. For example, in some variations, the IGDS 100 can be implemented as a user-side application that executes on the user computing device 10 to provide functionality as described with various examples. For example, as described below, the IGDS 100 can be implemented as a web application that executes in a browser application 80. As an addition or alternative, the IGDS 100 may be implemented as a native application developed for use on a particular platform, such as but not limited to LINUX, ANDROID, WINDOWS, or another platform. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to create, view, and/or modify various types of design interfaces using graphical elements. A design interface may include any layout of content and/or interactive elements, such as but not limited to a web page. The IGDS 100 can include processes that execute as or through a browser application 80 that is installed on the computing device 10.

As used herein, the term "browser application" refers to any program that accesses web content over a network, such as by using the Hypertext Transfer Protocol (HTTP) to access information resources over the Internet. In some examples, the browser application 80 is a commercially available browser application, such as but not limited to GOOGLE CHROME (developed by GOOGLE, INC.), SAFARI (developed by APPLE, INC.), and EDGE/INTERNET EXPLORER (developed by the MICROSOFT CORPORATION). As described by various examples, a browser application 80 can execute scripts, code, and/or other logic (the "programmatic components") to implement the functionality of the IGDS 100. Additionally, in some variations, the IGDS 100 can be implemented as part of a network service, where a browser application 80 communicates with one or more remote computers (e.g., server used for a network service) to executes processes of the IGDS 100.

In some examples, a browser application 80 retrieves some or all of the programmatic resources for implementing the IGDS 100 from a network site. As an addition or alternative, a browser application 80 can retrieve some or all of the programmatic resources from a local source (e.g., local memory residing with the computing device 10). The browser application 80 may also access various types of data sets in providing the IGDS 100. The data sets can correspond to files and libraries, which can be stored remotely (e.g., on a server, in association with an account) or locally.

In examples, the IGDS 100 is implemented as web code that executes in a browser application 80. In such examples, the processes of the IGDS 100 can be implemented as web code, such as Hyper Text Markup Language (HTML), JAVASCRIPT, Cascading Style Sheets (CSS), other scripts, and/or other embedded code which the browser application 80 downloads from a network site. For example, the browser application 80 can execute web code that is embedded within a web page, causing the IGDS 100 to execute at the user computer device 10 in the browser application 80. The web code can also cause the browser application 80 to execute and/or retrieve other scripts and programmatic resources (e.g., libraries) from the network site and/or other local or remote locations. By way of example, the browser application 80 may include JAVASCRIPT embedded in an HTML resource (e.g., web-page structured in accordance with HTML 5.0 or other versions, as provided under standards published by W3C or WHATWG consortiums) that is executed by the browser application 80. In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, a user of the computing device 10 operates the browser application 80 to access a network site, where programmatic resources are retrieved and executed to implement the IGDS 100. In this way, the user may initiate a session to implement the IGDS 100 to create, view, and/or modify a design interface. In some examples, the IGDS 100 includes a program interface 102, an input interface 118, and a rendering engine 120. The program interface 102 can include one or more processes that execute to access and retrieve programmatic resources from local and/or remote sources.

In some implementations, the program interface 102 can generate a canvas 122 using programmatic resources that are associated with the browser application 80 and/or an associated browser executing the browser application (e.g., an HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with a canvas 122. The application framework can include data sets that define or configure, for example, a set of interactive graphic tools that integrate with the canvas 122. For example, the interactive graphic tools include an input interface 118, to enable the user to provide input for creating and/or editing a design interface.

According to some examples, the input interface 118 can be implemented as a functional layer that is integrated with the canvas 122 to detect and interpret user input, such as the input interface 118. The input interface 118 is a user interface that can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location/s of input), as well as inputs to define properties (e.g., dimensions) of a selected shape.

Additionally, the program interface 102 can be used to retrieve, from local or remote sources, programmatic resources and data sets that include active workspace data 110. As used herein, the term "workspace data" refers to data describing a design interface that can be loaded by the IGDS 100, the term "design interface under edit" refers to a design interface that is loaded in the IGDS 100, and the term "active workspace data" refers to workspace data corresponding to a design interface under edit (DIUE) that is loaded in the IGDS 100.

The retrieved data sets can include one or more pages that include design elements that collectively form a design interface, or a design interface that is in progress. For example, the program interface 102 may be used to retrieve one or more files comprising active workspace data 110 that include one or multiple data structure representations which collectively define the DIUE 125. The IGDS 100 may also load and/or request additional data sets that are associated with the active workspace. As an example, the program interface 102 can retrieve, from local memory, or another source (e.g., from network service 152 of FIG. 1B), one or more types of profile information (e.g. profile information 109 of FIG. 1B), such as user profile information that identifies past activities of the user of the computing device 10 when utilizing the IGDS 100. The profile information can identify, for example, input types (or actions) of the user with respect to the page(s) of the active workspace, or more generally, input actions of the user in a prior time interval. In some variations, the profile information can also identify historical or contextual information about individual design interfaces associated with the profile.

In some examples, the rendering engine 120 renders the DIUE 125 described by the active workspace data 110 on the canvas 122. The DIUE 125 includes graphic elements and their respective properties as described by the active workspace data 110. The user can edit the DIUE 125 using the input interface 118. As an addition or alternative, the rendering engine 120 can generate a blank page for the canvas 122, and the user can use the input interface 118 to generate the DIUE 125. As rendered, the DIUE 125 can include graphic elements such as a background and/or a set of objects (e.g., shapes, text, images, programmatic elements), as well as properties of the individual graphic elements. Each property of a graphic element can include a property type and a property value. For an object, the types of properties include shape, dimension (or size), layer, type, color, line thickness, font color, font family, font size, font style, and/or other visual characteristics. Depending on implementation details, the properties reflect attributes of two- or three-dimensional designs. In this way, property values of individual objects can define visual characteristics such as size, color, positioning, layering, and content for elements that are rendered as part of the DIUE 125. Workspace data, such as the active workspace data 110 corresponding to the DIUE 125, can describe one or more objects belonging to the design interface.

In examples, individual design elements may also be defined in accordance with a desired run-time behavior. By way of example, some objects can be defined to have run-time behaviors that are either static or dynamic. The properties of dynamic objects may change in response to predefined run-time events generated by the underlying application that is to incorporate the DIUE 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more properties of the object may change based on user input during the run-time of the application.

The input interface 118 can process at least some user inputs to determine input information 127, where the input information 127 indicates (i) an input action type (e.g., shape selection, object selection, sizing input, color selection), (ii) an object or objects that are affected by the input action (e.g., an object being resized), (iii) a desired property that is to be altered by the input action, and/or (iv) a desired value for the property being altered. The program interface 102 can receive the input information 127, and the program interface 102 can implement changes indicated by the input information 127 to update the active workspace data 110. The rendering engine 120 can update the canvas 122 to reflect the changes to the affected objects in the DIUE 125.

In examples, the input interface 118 can include various user-interactive input panels 123-124, 126 to organize the display, selection, organization, and interaction with objects represented as part of the DIUE 125 on the canvas 122. For example, the input interface 118 can include an object panel 123 to display a list of components for use in creating the DIUE 125 as well as a list of objects that currently comprise the DIUE 125. Alternatively and/or in addition, the input interface 118 can include a properties panel 124 to display relevant properties, and values associated with those properties, for objects on the DIUE 125. For example, the properties panel 124 can display the properties of a user-selected object or set of objects.

In examples, the properties panel 124 can contain multiple sub-panels, each of which displays an object property specific to that panel. The sub-panels can include contextual panels that are displayed depending on user interaction with objects on the canvas 122 or user interaction with the input interface 118. For example, when a user selects a rectangle object on the canvas 122, the properties panel 124 can display sub-panels for each of the properties of that rectangle object, including alignment, location, layer, fill, stroke, and effects. In further examples, the properties panel 124 can display sub-panels in response to the selection of multiple objects that share one or more properties.

Selection Property Panel

In examples, the input interface 118 includes a selection property panel 126. The selection property panel 126 may be a sub-panel of the property panel 124, or may be a separate user-interactive input panel. In some aspects, the selection property panel 126 is displayed in response to an input action by the user, where the input action includes selecting a selection of a plurality of objects using the input interface 118. The user may select multiple objects and/or one object that contains multiple other objects. For example, a selected object may include one or more child objects, which are counted in the selection of the plurality of objects.

When a user selects the plurality of objects, the IGDS 100 aggregates the property values for one or more properties of the plurality of objects. For example, the IGDS 100 may, for a property, identify a set of one or more property values corresponding to the property for objects in the plurality of objects. The rendering engine 120 displays the identified set of property values on the selection property panel 126 of the input interface 118.

In some examples, the property is a color value and/or style of an aspect of an object. A style defines a set of one or more property values for one or more properties that can be used across multiple objects. For example, the identified set of property values of the plurality of objects may include colors values and/or styles can be taken from any property of the selected objects that includes a color value, such as but not limited to a fill color property, a background color property, a stroke color property, a gradient color property, and/or any other property that where the property value specifies a color value and/or a style.

As an addition or variation, the selection property panel 126 may include property values for a font property. A font property describes the appearance of text in a design interface. Examples of font properties include, but are not limited to font color, font family, font size, font style, or another font property. A user may interact with, for example, a selection font panel to selectively match a font property (e.g., type of font, font style property, font size, etc.) amongst select objects (e.g., text provided with select wireframes).

In some variations, the set of one or more property values excludes property values of the plurality of objects that are not shared by two or more of the plurality of objects. For example, the selection property panel 126 may only displayed when any of the selected plurality of objects includes one or more colors values and/or styles that is shared by more than one of the selected objects. In some variations, the selection property panel 126 is displayed in response to a determination that the selected objects have two or more different color values or styles among their properties. The selection property panel 126 may exclude property values that are not shared by two or more of the plurality of objects.

In examples, the selection property panel 126 displays two or more separate categories for the property values of a particular property. For example, the selection property panel 126 may include a first category containing a list of styles, and a second category containing a list of color values. Depending on implementation, the plurality of objects can include, for example, shapes, lines or shape borders, and text. Still further, in some variations, the property can include a line thickness, a fill pattern, a shading type, a transparency value, a font, or other visual attribute. If the selected objects include multiple shared properties, each shared property may be detected as a category.

In examples, the selection of objects may be entered by the user using a selection tool for drawings or otherwise specifying a selection area over a canvas 122 displaying a DIUE 125. The input interface 118 may interpret an input action by the user by detecting objects which are present in the selection area over the canvas 122, including objects which are on different layers.

In some examples, the selection property panel 126 includes colors values and/or styles that are sorted by usage, such as from most commonly used to least commonly used. For example, the set of one or more property values may be displayed in descending order of frequency in the plurality of objects. In some cases, if two property values are shared between an equal number of objects, the color/styles may be sorted alphabetically by hex value (e.g., for color values), alphabetically by hex value of first color (e.g., for gradients), or by name (e.g., for styles). In some examples, gradients may be shown as a whole, rather than as individual colors within gradients, and colors and styles of parts of text may be counted independently. In further examples, the IGDS 100 can count fills independently for objects with multiple fills, and colors with different transparency values can be treated separately (e.g., counting #ababab00 and #ababab55 as two distinct color values). In some examples, the selection property panel 126 can ignore certain types of color values. For example, image fills, masks, effects, layout grid colors, and any color value for an object or property marked as invisible can be ignored.

In some examples, each identified property value is enumerated on a panel or interface (e.g., selection property panel 126) as an interactive feature for enabling the user to select and modify the property on the selected object(s). For example, the property value/s may be displayed as one or more interactive features for enabling the user to select and modify the property value/s for corresponding objects having the property value in the selected plurality of object(s). In some aspects, the selection property panel 126 accepts user input in order to display and alter color values of the selected objects. Upon detecting that a user has clicked on one of the colors listed on the selection property panel 126, the rendering engine 120 displays a color picker interface that enables the user to select a new color. Upon determining that a new color has been selected and the color picker being closed, the input interface 118 can send the input information 127 identifying the new color to the program interface 102.

When the program interface 102 receives input comprising a new value for a selected property value, the program interface 102 updates the user-side active workspace data 110, changing the property for objects having the selected property value to the new property value. For example, if a user uses the color picker to select a new color value, the program interface 102 can update the user-side active workspace data 110 so that objects having the original color value for the property are updated to the new color value. In addition, the rendering engine 120 can update the selection property panel 126 to display the new color value in place of the original selected color value. In cases where the new color value matches one of the already-displayed color values identified by the IGDS 100 in the selection of objects, the IGDS 100 can re-sort and collate the presentation of color values based on the updated counts of each property value remaining in the set of color values.

Similarly, the selection property panel 126 may accept user input in order to display and alter styles applied to the selected objects. Upon detecting that a user has clicked on one of the styles listed on the selection property panel 126, the rendering engine 120 displays a style picker interface that enables the user to select a new style. Upon determining that a new style has been selected and the style picker being closed, the input interface 118 can send the input information 127 identifying the new style to the program interface 102. The program interface 102 updates the user-sided active workspace data 110 of each of the objects having a property value of the old style, changing the old style to the new style. In addition, the rendering engine 120 can update the selection property panel 126 to display the new style in place of the old one, or in cases where the new style matches one of the styles already displayed, re-sort and collate the presentation of styles based on the updated counts of each style remaining among the selected objects.

In some aspects, color values within the application can conform to one of many color representation formats, including RGB (red, green, blue), HSL (hue, saturation, lightness), HSV (hue, saturation, value), and others. Objects used in a given DIUE 125 may have color values using any of these representations, and therefore a DIUE 125 may include multiple objects with different color representations which may not directly map to each other. This occurs when one color representation is wider than another, leading to some colors that are slightly different in one representation but are identical in another representation. For example, HSL (200 50 77) and HSL (200 51 77) both resolve to #A6CEE2 in a hexadecimal RGB representation. This discrepancy would result in two seemingly identical colors appearing separately on the selection property panel 126. In some implementations, the IGDS 100 rounds the colors up for the purpose of the selection property panel 126. In the example above, both HSL colors would be grouped together, and any selection or change to #A6CEE2 would affect objects colored HSL (200 50 77) and HSL (200 51 77).

In some examples, the selection property panel 126 allows a user to quickly select objects of the plurality of objects that share the same property value. For example, the user may select a property value in the selection property panel 126 to change the property value as described above. As a variation, the selection property panel 126 may allow the user to quickly select the objects sharing the same property value to perform any other operation on the corresponding objects, such as highlighting the objects in the display, moving the objects, changing a different property of the objects, deleting the objects, or any other operation on the objects sharing the selected property value. In some examples, in response to receiving the user input specifying the selected property value, the IGDS 100 update the selection of the plurality of objects to remove one or more objects not having the selected property value.

Network Computer System to Implement IGDS

Figure 1B:
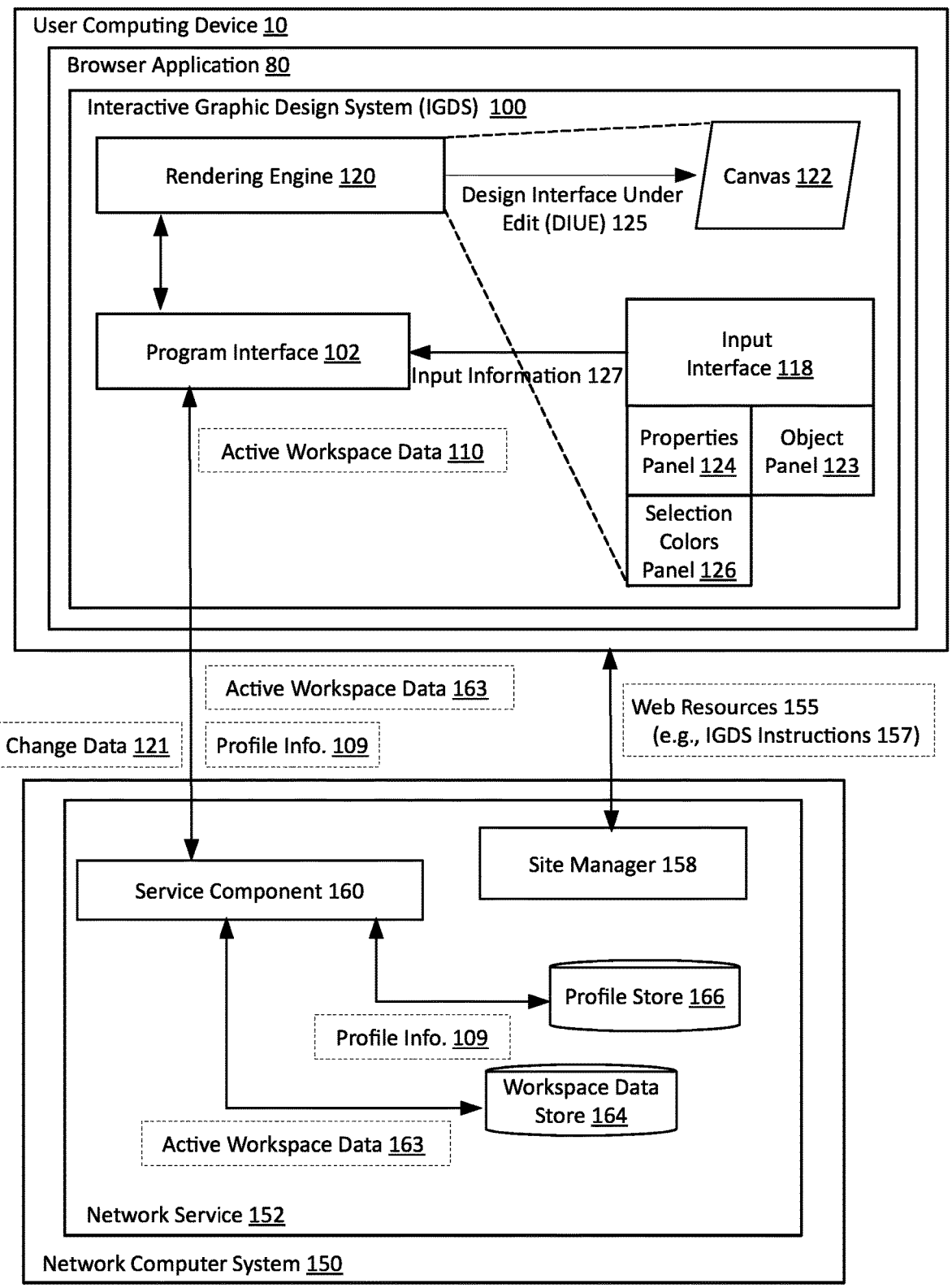
FIG. 1B illustrates a network computer system to implement an interactive graphic design system on a user computing device, according to one or more examples.

FIG. 1B illustrates a network computer system to implement an interactive graphic design system on a user computing device, according to one or more examples. A network computer system 150 can be implemented using one or more servers that communicate with user computing devices over one or more networks. In some examples, the network computer system 150 performs operations to enable the interactive graphic design system (IGDS) 100 to be implemented on the user computing device 10.

In variations, the network computer system 150 provides a network service 152 to support the use of the IGDS 100 by one or more user computing devices 10, including user computing devices 10 that utilize a browser application 80. The network computer system 150 can include a site manager 158 that manages a website where a set of web resources 155 (e.g., web pages, web code, and/or other web resources) are made available for site visitors. The web resources 155 can include instructions, such as scripts or other logic, which are executable by browsers or web components of user computing devices. In some variations, once the browser application 80 accesses and downloads the web resources 155, the browser application 80 executes the IGDS instructions 157 to implement functionality such as described with some examples of FIG. 1A. For example, the IGDS instructions 157 can be executed by browser application 80 to initiate the program interface 102 on the user computing device 10. The initiation of the program interface 102 may coincide with the establishment of, for example, a web-socket connection between the program interface 102 and a service component 160 of the network computer system 150.

In some examples, the IGDS instructions 157, when executed in the browser application 80, browser initiate one or more processes of the program interface 102, causing the IGDS 100 to retrieve additional programmatic resources and data sets for implementing functionality as described herein by one or more examples. The web resources 155 can, for example, embed logic (e.g., JAVASCRIPT code), including GPU accelerated logic, in an HTML page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web pages that can be downloaded onto the user computing device 10 after authentication is performed, and/or once the user performs additional actions (e.g., downloading one or more pages of the workspace associated with the account identifier). Accordingly, in one or more examples as described, the network computer system 150 can communicate the IGDS instructions 157 to the user computing device 10 through a combination of network communications, where the IGDS instructions 157 are received and executed by the browser application 80.

Upon accessing the website, browser application 80 can automatically (e.g., through saved credentials) or through manual input, communicate an account identifier to the service component 160. In some examples, browser application 80 can also communicate one or more additional identifiers that correlate to a user identifier. Additionally, in some examples, the service component 160 can use the user or account identifier of the user identifier to retrieve profile information 109 from a user profile store 166. As an addition or variation, profile information 109 for the user can be determined and stored locally on the user computing device 10. The service component 160 may also determine, based on the user credentials, a permission setting or role of the user in connection with the account identifier. The permission settings or role of the user can determine, for example, workspace data that can be accessed by the user. In some examples, the implementation of the rendering engine 120 on the user computing device 10 can be configured based at least in part on the role or setting of the user and/or affiliation of the user with a particular organization.

The service component 160 can also retrieve and provide workspace data corresponding to a workspace that is linked to the user account or identifier from a workspace data store 164. For example, when a user selects a particular design interface to load in the IGDS 100, the program interface 102 may submit a request to the service component 160. The service component 160 may access the workspace data store 164 to retrieve the corresponding active workspace data 163 and provide the active workspace data 163 to the IGDS 100.

In some examples, the IGDS 100 maintains user-side active workspace data 110 corresponding to the active workspace data 163 received from the network computer system 150. For example, the user-side active workspace data 110 may begin as a copy of the received active workspace data 163 that is stored in memory at the user computing device 10. In some examples, the IGDS 100 initiates a canvas 122 and renders the corresponding design interface under edit (DIUE) 125 to the canvas 122 based on the active workspace data 110. For example, the IGDS 100 can initiate an HTML 5.0 canvas as a component of the browser application 80, and the rendering engine 120 can render the corresponding DIUE 125 on the canvas 122.

In some examples, any changes to the DIUE 125 made using the IGDS 100 can also be updated in the user-side active workspace data 110, as stored on the computing device 10. In some embodiments, the program interface 102 sends change data 121 to the network computer system 150. The change data 121 reflects one or more changes to the DIUE 125 made in the IGDS 100 and to the user-side active workspace data 110. For example, the program interface 102 can stream change data 121 to the service component 160 periodically and/or in real-time as changes are made at the user computing device 10.

At the network computer system 150, the service component 160 can receive the change data 121, which in turn can be used to implement changes to the server-side active workspace data 163. In this way, the server-side active workspace data 163 at the network computer system 150 can mirror (or be synchronized with) the user-side active workspace data 110 on the user computing device 10. For example, the program interface 102 can stream the changes as change data 121 to the service component 160 in order to synchronize the user-side active workspace data 110 and the server-side active workspace data 163 corresponding to the DIUE 125. This process can be performed repeatedly or continuously so that the user-side active workspace data 110 and the server-side active workspace data 163 describing the DIUE 125 remain synchronized.

Collaborative Network Platform

Figure 1C:
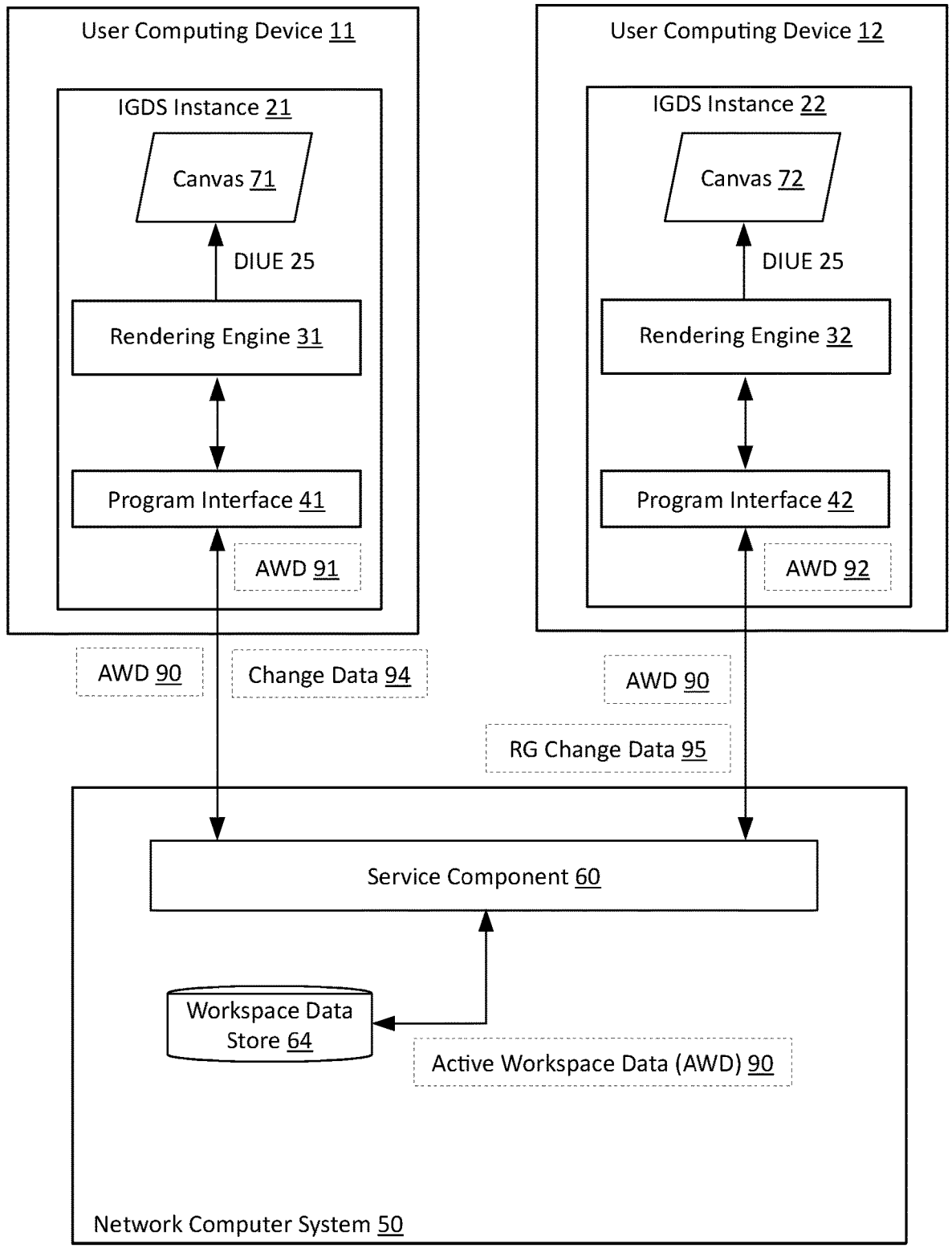
FIG. 1C illustrates a network computer system to implement an interactive graphic design system for multiple users in a collaborative network platform, according to one or more examples.

FIG. 1C illustrates a network computer system to implement an interactive graphic design system for multiple users in a collaborative network platform, according to one or more examples. In an example of FIG. 1C, a collaborative network platform is implemented by the network computer system 50, which communicates with multiple user computing devices 11-12 over one or more networks (e.g., the World Wide Web) to implement interactive graphic design system (IGDS) instances 21-22 on the user computing devices 11-12. While FIG. 1C illustrates an example in which two users utilize the collaborative network platform, examples as described allow for the network computer system 50 to enable collaboration on design interfaces among users using a larger number of user computing devices. Among other advantages, the collaborative network platform allows users to more concurrently access a design interface, and to conveniently manipulate objects based on a shared property value while the network computer system 50 manages synchronization and access issues.

With respect to FIG. 1C, the user computing devices 11-12 can be assumed as being operated by users that are associated with a common account or accounts associated with the same design interface. Each user computing device 11-12 implements an IGDS instance 21-22 to access the same design interface (e.g., design interface under edit (DIUE) 25) during respective sessions that overlap with one another. Accordingly, each of the user computing devices 11-12 may access the same set of active workspace data 90 at the same time, with the respective program interface 41-42 of the IGDS instance 21-22 on each user computing device 11-12 operating to establish a corresponding communication channel (e.g., a web socket connection) with the service component 60. In examples, the service component 60 can load the active workspace data 90 corresponding to the design interface under edit (DIUE) 25 from a workspace data store 64, and transmit a copy of the active workspace data 90 to each user computing device 11-12 such that the respective rendering engines 31-32 render the DIUE 25 corresponding to the active workspace data 90 at the same time, such as during overlapping sessions.

In some examples, after receiving the active workspace data 90, the IDGS instance 21 maintains user-side active workspace data 91 at user computing device 11, and the IDGS instance 22 maintains user-side active workspace data 92 at user computing device 12. The service component 60 can also maintain network-side active workspace data 90 for the DIUE 25 loaded by the IGDS instances 21-22.

In some examples, the network computer system 50 can continuously synchronize the active workspace data 90-92 corresponding to the DIUE 25 loaded in one or more IGDS instances 21-22 on the user computing devices 11-12. In particular, changes made by users to the DIUE 25 on one user computing device 11 may be reflected on the DIUE 25 rendered on the other user computing device 12 in real-time. By way of example, when a change is made to the DIUE 25 at user computing device 11, the respective rendering engine 31 updates the respective canvas 71, and the respective program interface 41 updates the respective user-side active workspace data 91. The respective program interface 41 of the IGDS instance 21 transmits change data 94 reflecting the DIUE 25 change to the service component 60. The service component 60 processes the change data 94 from the user computing device 11 and uses the change data 94 to make a corresponding change to the server-side active workspace data 90. The service component 60 can also transmit remotely-generated change data 95 (which in the example provided, corresponds or reflects the change data 94 received from the user computing device 11) to the other user computing device 12 that has loaded the same DIUE 25, causing the corresponding IGDS instance 22 to update the DIUE 25, such as by causing the program interface 42 to update the corresponding user-side active workspace data 92 and causing the respective rendering engine 32 to update the respective canvas 72.

To facilitate the synchronization of the active workspace data 90-92 at the user computing devices 11-12 and the network computer system 50, the network computer system 50 may implement a stream connector to merge the data streams between the network computer system 50 and user computing devices 11-12 that have loaded the same DIUE 25. For example, the stream connector may merge a first data stream between user computing device 11 and the network computer system 50 with a second data stream between user computing device 12 and the network computer system 50.

In some implementations, the stream connector can be implemented to enable each computing device 11-12 to make changes to the server-side active workspace data 90 without added data replication that may otherwise be required to process the streams from each user computing device 11-12 separately.

Additionally, over time, one or more user-side active workspace data 91-92 versions may become out-of-sync with the server-side active workspace data 90. In such cases, the respective computing device 11-12 can re-download the server-side active workspace data 90 to restart its maintenance of the corresponding user-side active workspace data 91-92 and DIUE 25 rendered on the respective canvas 71-72.

Among other advantages, in a collaborative environment, multiple users may update DIUE 25 at same time. Embodiments as described enable individual users to change one or more properties (e.g., color, font) of wireframes or other objects which the user is working on, without affecting other objects or aspects of the shared DIUE 25 which other collaborative users may be working on at the same time.

EXAMPLES

Figure 2:
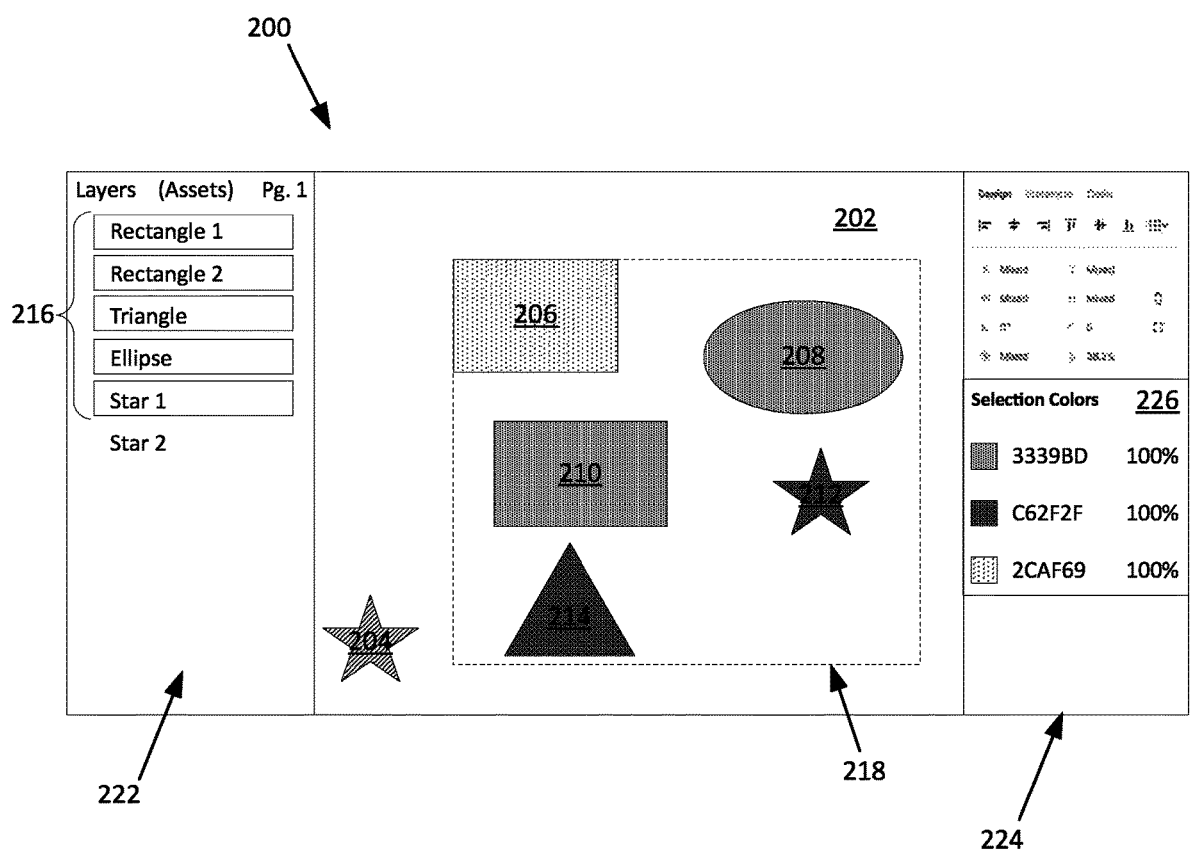
FIG. 2 illustrates a user interface for an interactive graphic design system, according to one or more examples.
Figure 3A:
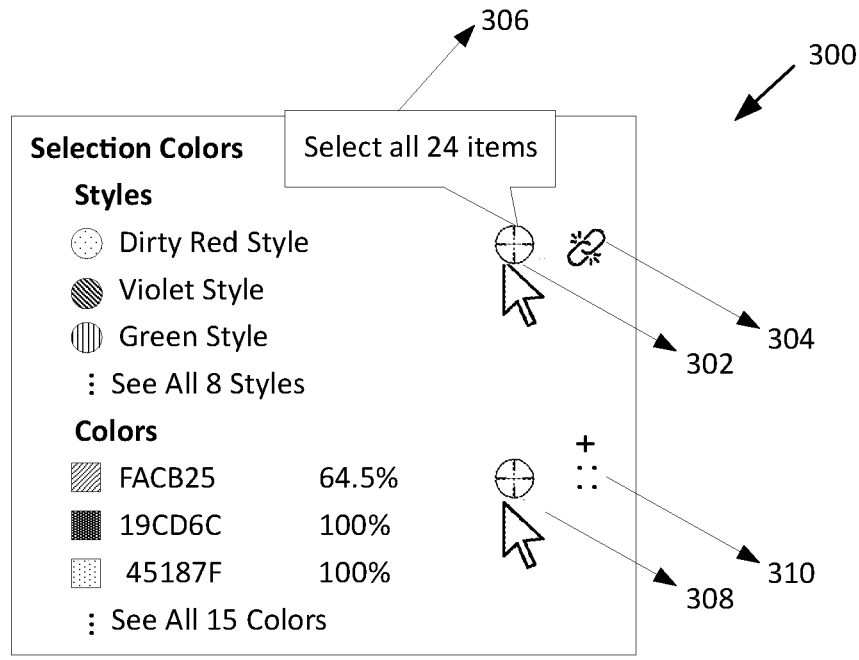
FIGS. 3A-3B illustrate further user interfaces comprising a selection colors panel for an interactive graphic design system, according to one or more examples.
Figure 3B:
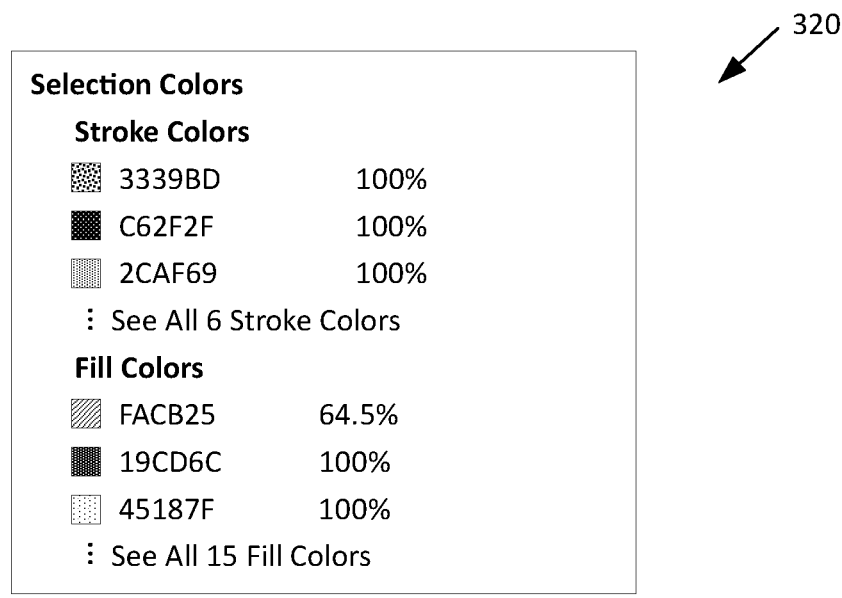

FIG. 2 illustrates a user interface for an interactive graphic design system (IDGS), in accordance with one or more examples. FIGS. 3A-3B illustrate user interfaces comprising a selection colors panel for an interactive graphic design system (IDGS), in accordance with one or more examples. Example user interfaces, as shown and described by FIG. 2, and FIGS. 3A-3B, may be generated by an IGDS (e.g., IGDS 100, IGDS instance 21-22) as described with various examples. In describing examples of FIG. 2 and FIGS. 3A-3B, reference may be made to elements of FIG. 1A through FIG. 1C for purpose of illustrating suitable components for generating and implementing the user interfaces as described.

With reference to FIG. 2, a user interface 200 includes a canvas 202 on which a design interface under edit is rendered. The user interface 200 may also include an input interface that can be provided with the canvas 202 to enable the user to specify inputs of different types. The input interface is divided into two parts: an objects panel 222 on the left side of the canvas 202, and a properties panel 224 on the right side of the canvas. The properties panel 224 includes several sub-panels that are displayed, hidden, or collapsed depending on user interactions with objects on the canvas 202 and the panels themselves.

As depicted in FIG. 2, six colored objects 204-214 of a design interface under edit (DIUE) are rendered on a canvas 202. Five selected objects 206-214 are selected by a user input comprising a bounding box 218 entered over the canvas 202. The selected objects 206-214 have three color values for their fill color property, and the color values are displayed on the selection colors panel 226. In this example, two of the objects are filled blue with the hexadecimal RGB value #3339BD, two of the objects are filled red with the hexadecimal RGB value #C62F2F, and one object is filled green with the hexadecimal RGB value #2CAF69. All of the color values are 100% opaque.

Upon detecting that a user has clicked on one of the colors listed on the selection colors panel 226, a color picker interface that enables the user to select a new color can be displayed. Upon determining that a new color has been selected and the color picker being closed, each of the objects that had a property containing the old color value can be changed to the new color selected on the color picker. In addition, the selection colors panel 226 can update to display the new color in place of the old one, or in cases where the new color matches one of the colors already displayed, re-sort and collate the presentation of colors based on the updated counts of each color remaining among the selected objects. For example, if a user selects the color blue (with the hexadecimal RGB value #3339BD) on the selection colors panel 226 and then chooses the green #2CAF69 color from the color picker, the selected blue rectangle and blue ellipse on the canvas 202 have their fill color values updated to #2CAF69. In addition, since there would then be three green objects to two red objects, the selection colors panel 226 would be updated to display green (#2CAF69) first and red (#C62F2F) second.

With reference to FIG. 3A, the user interface includes a selection colors panel 300 that enables a user of an IGDS to select objects sharing a property value for a property. As shown, the property values include styles and colors, which are displayed as separate groups. In the example shown, each group has its own overflow item that the user can click to open. Accordingly, in response to user input clicking on "See All 8 Styles," the selection colors panel 300 expands to display five additional hidden styles along with the three already-displayed styles. Similarly, in response to user input clicking on "See All 15 Colors," the selection colors panel 300 expands to display twelve additional hidden fills along with the three already-displayed colors.

In some examples, the selection colors panel 300 enables a user of the IGDS to hover over property values and perform actions on the objects sharing the property value. For example, upon detecting a hover input over a selection icon 302 for a particular style, the selection colors panel 300 may display a tooltip 306 notifying the user of the number of objects in the selection of objects that have the particular style as the property value. For example, 24 objects in the selection of objects have a property value set as "Dirty Red Style". Upon the user clicking the selection icon, the user interface can update to reflect the selection of all 24 of the corresponding objects.

In some examples, the selection colors panel 300 includes a "break style" icon 304 for one or more styles. When the "break style" feature is selected, the IGDS turns all selected instances of that style into a simple color value. For example, if the "break style" icon 304 is selected, then the IGDS may change the property value for the 24 objects to the corresponding color value.

In some examples, upon detecting a hover input over a selection icon 308 for a particular color value, the selection colors panel 300 may display a tooltip notifying the user of the number of objects in the selection of objects that have the particular color value as the property value. In some examples, the selection colors panel 300 includes a "create style" icon 310 for one or more color values. When the "create style" feature is selected, the IGDS turns the property value for the selected objects sharing the particular color value into a style.

With reference to FIG. 3B, the selection colors panel 320 may display property values for multiple properties. For example, for a selection of objects, the selection colors panel 320 may display a first group of property values corresponding to a first property (e.g., stroke color), and a second group of property values corresponding to a second property (e.g., fill color).

Methodology

Figure 4A:
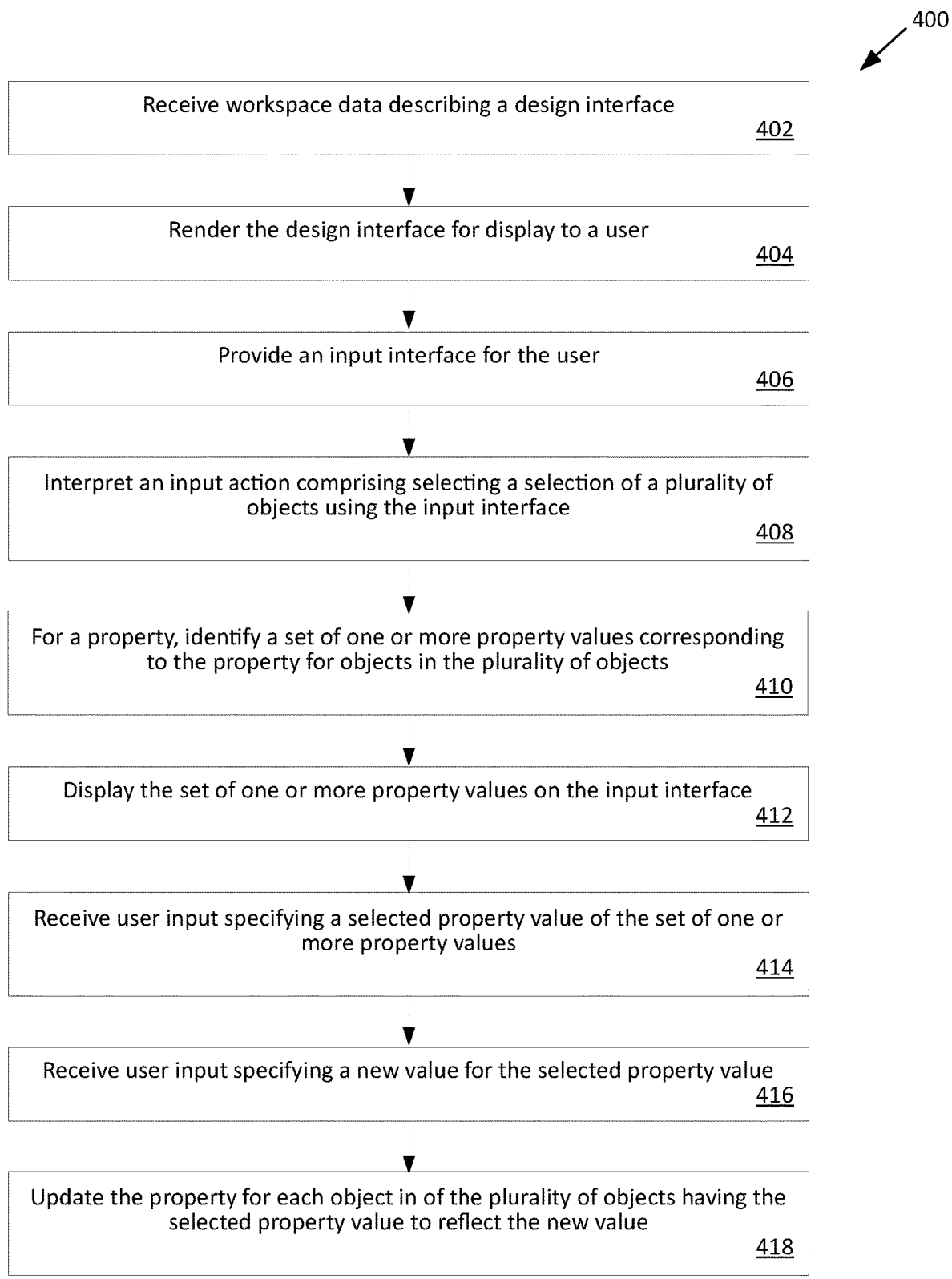
FIGS. 4A-4B illustrate processes for design interface object manipulation based on aggregated property values, according to one or more examples.

FIG. 4A illustrates a process for design interface object manipulation based on aggregated property values, according to one or more examples. Process 400 may be performed by one or more computing devices and/or processes thereof. For example, one or more blocks of process 400 may be performed by a user computing device (e.g., user computing devices 10-12, 600). In some examples, one or more blocks of process 400 are performed by a user computing device executing interactive graphic design system (IGDS) instructions provided by a network computer system (e.g., network computer system 150, 50).

At block 402, the user computing device receives workspace data (e.g., active workspace data 110, 90) describing a design interface. The design interface may include any layout of content and/or interactive elements, such as but not limited to a web page. In some examples, a network computer system storing workspace data in a workspace data store (e.g., workspace data store 164, 64) provides the workspace data to the user computing device.

At block 404, the user computing device renders the design interface for display to a user. For example, the user computing device may render the design interface on a canvas (e.g., canvas 122, 71-72) At block 406, the computing device provides an input interface (e.g. input interface 118) for the user. In some examples, the input interface 118 can be implemented as a functional layer that is integrated with a canvas to detect and interpret user input, including user input involving the rendered design interface.

At block 408, the computing device interprets an input action by the user, the input action comprising selecting a selection of a plurality of objects using the input interface. At block 410, the user computing device categorizes the plurality of objects into a set of one or more groups based on a set of one or more property values for a property. For example, a property value in the set of one or more property values may correspond to a color value.

At block 412, the user computing device displays the set of one or more property values on the input interface. In some examples, the property value/s are enumerated on a respective selection property panel (e.g., selection color panel). The property value/s may be displayed as one or more interactive features for enabling the user to select and modify the property value/s for corresponding objects of the selected object(s).

At block 414, the user computing device receives user input specifying a selected property value of the set of one or more property values. At block 416, the user computing device receives user input specifying a new value for the selected property value. At block 418, the user computing device updates the property for each object in the group corresponding to the selected property value to reflect the new value.

Figure 4B:
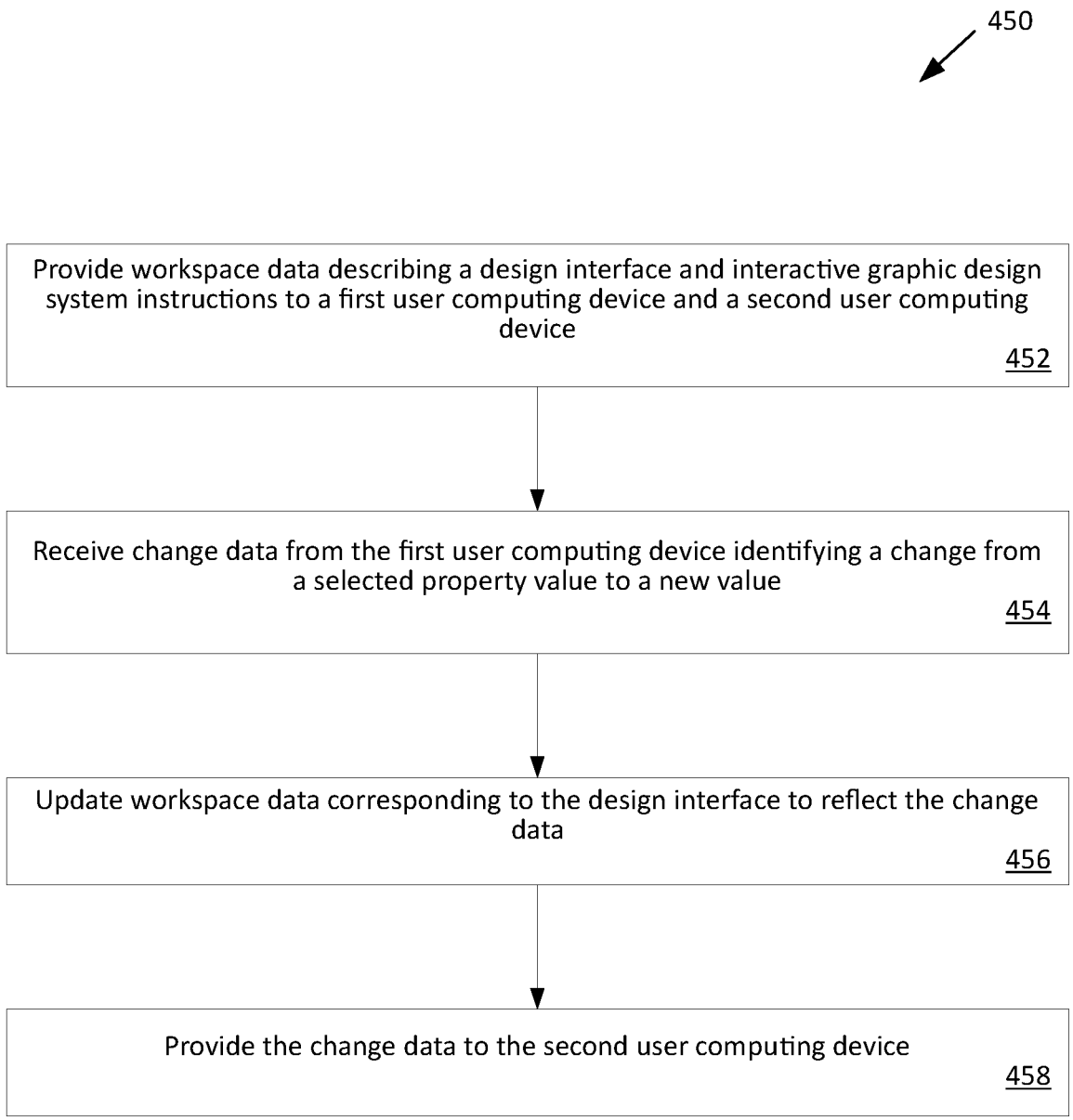

FIG. 4B illustrates a process for design interface object manipulation based on aggregated property values, according to one or more examples. Process 450 may be performed by one or more computing devices and/or processes thereof. For example, one or more blocks of process 450 may be performed by a network computer system (e.g., network computer system 150, 50).

At block 452, the network computer system provides workspace data describing a design interface and interactive graphic design system (IGDS) instructions (e.g. IGDS instructions 157) to a first user computing device (e.g., user computing device 11) and a second user computing device (e.g., user computing device 12). The IGDS instructions, when executed at the user computing devices, causes the user computing devices to provide functionality at the user computing devices as described with various examples.

At block 454, the network computer system receives change data (e.g., change data 94) from the first user computing device identifying a change from a selected property value to a new value for objects corresponding to the selected property value. For example, the change data may reflect changes to a property value for one or more objects in a selection of a plurality of objects. In some examples, the change data reflects changes made by a user via a selection property panel (e.g. selection colors panel, selection font panel, etc.).

At block 456, the network computer system updates workspace data corresponding to the design interface to reflect the change data. For example, the network computer system may update server-side active workspace data (e.g. active workspace data 90) and/or corresponding workspace data in a workspace data store (e.g. workspace data store 64).

At block 458, the network computer system provides the change data to the second user computing device. In some examples, the change data cause the second user computing device to update active workspace data at the second user computing device, and to update a rendering of the design interface at the second user computing device.

Network Computer System

Figure 5:
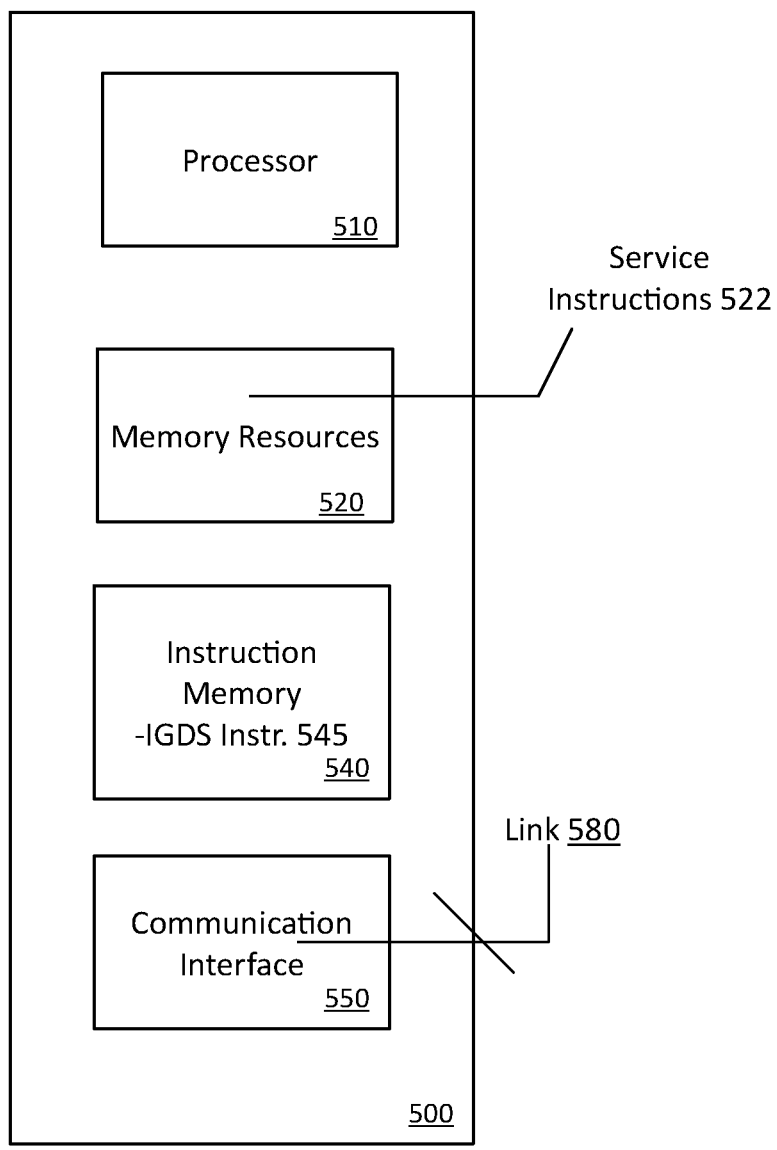
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computer system 150 of FIG. 1A through FIG. 1C.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computer system to implement the network service 152 and operate as the network computer system 150 in examples such as described with FIG. 1A through FIG. 1C.

The computer system 500 may also include additional memory resources ("instruction memory 540") for storing executable instruction sets ("IGDS instructions 545") which are embedded with web-pages and other web resources, to enable user computing devices to implement functionality such as described with the IGDS 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
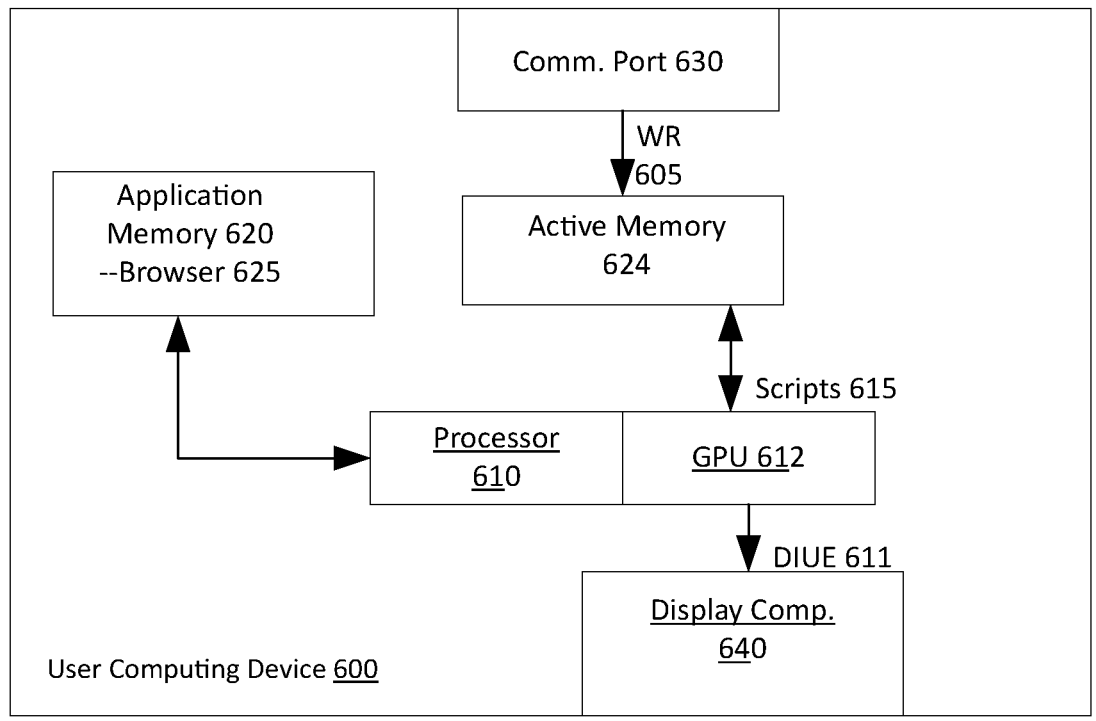
FIG. 6 illustrates a user computing device for use with one or more examples, as described.

FIG. 6 illustrates a user computing device for use with one or more examples, as described. In examples, a user computing device 600 can correspond to, for example, a work station, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser application 625. A user can operate the browser 625 to access a network site of the network service 152, using the communication port 630, where one or more web pages or other resources 605 for the network service 152 (see FIG. 1A through FIG. 1C) can be downloaded. The web resources 605 can be stored in the active memory 624 (cache).

As described by various examples, the processor 610 can detect and execute scripts and other logic which are embedded in the web resource in order to implement the IGDS 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 615 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors; and
one or more memory resources storing interactive graphic design system instructions and system instructions that, when executed by the one or more processors, cause the one or more processors to perform operations that comprise providing workspace data for a design interface and the interactive graphic design system instructions to a user computing device, wherein the interactive graphic design system instructions, when executed at the user computing device, causes the user computing device to:
render a plurality of objects of the design interface on a canvas;
interpret an action by a user selecting an area over a portion of the canvas;
identify multiple objects of the plurality of objects that are contained in the selected area, the multiple objects including at least a first objecting having one or more child objects;
determine, for each object of the multiple objects, a corresponding property value of a first type of property;
in response to the user selecting the area, display, as part of a selection property panel, multiple representations of property values of the first type of property, each representation of the multiple representations representing the corresponding property value of at least one object of the multiple objects;
wherein the selection property panel displays the multiple representations in accordance with an order that is based at least in part on usage amongst the multiple objects present in the selected area;
receive a user input through the selection property panel, the user input selecting a property value for the first type of property; and
update one or more objects of the multiple objects present in the area to have the selected property value of the first type of property, without updating a corresponding property value of the first type of property of any other object of the plurality of objects.

2. The network computer system of claim 1, wherein the first type of property is a color or a style.

3. The network computer system of claim 1, wherein the first type of property is a font.

4. The network computer system of claim 1, wherein the system instructions, when executed by the one or more processors, cause the one or more processors to:
receive change data from the user computing device, the change data representing the updated one or more objects of the multiple objects; and
in response to receiving the change data, update, in a workspace data store, workspace data corresponding to the design interface to reflect the change data.

5. The network computer system of claim 4, wherein the system instructions, when executed by the one or more processors, cause the one or more processors to:
provide the workspace data describing the design interface and the interactive graphic design system instructions to a second user computing device;
in response to receiving the change data from the user computing device, provide the change data to the second user computing device;
wherein the interactive graphic design system instructions, when executed at the second user computing device, cause the second user computing device to update the workspace data and a rendering of the design interface at the second user computing device, so as to render the updated one or more objects of the multiple objects on a canvas of the second user computing device.

6. The network computer system of claim 1, wherein the system instructions, when executed by the one or more processors, cause the one or more processors to:
receive a notification of the user input specifying the selected property value at the user computing device;
in response to the notification, send a message to one or more other user computing devices working with the design interface, wherein the message causes locking of the objects in the plurality of objects corresponding to the selected property value at the one or more other user computing devices.

7. The network computer system of claim 1, wherein the selection property panel indicates the one or more property values for the first type of property that are most frequently used amongst the multiple objects present in the area.

8. A non-transitory computer-readable medium that stores instructions, executable by one or more processors, to cause the one or more processors to:
receive workspace data describing a design interface;
render a plurality of objects of the design interface on a canvas;
interpret an action by a user selecting an area over a portion of the canvas;
identify multiple objects of the plurality of objects that are contained in the selected area, the multiple objects including at least a first objecting having one or more child objects;
determine, for each object of the multiple objects, a corresponding property value of a first type of property;
in response to the user selecting the area, displaying, as part of a selection property panel, multiple representations of property values of the first type of property, each representation of the multiple representations representing the corresponding property value of at least one object of the multiple objects;
wherein the selection property panel displays the multiple representations in accordance with an order that is based at least in part on usage amongst the multiple objects present in the selected area;
receive a user input through the selection property panel, the user input selecting a property value for the first type of property; and
update one or more objects of the multiple objects present in the area to have the selected property value of the first type of property, without updating a corresponding property value of the first type of property of any other object of the plurality of objects.

9. The non-transitory computer-readable medium of claim 8, wherein the first type of property is a color, a style or a font.

10. The non-transitory computer-readable medium of claim 8, wherein the instructions, when executed by the one or more processors, cause the one or more processors to:
transmit change data to a network computer system, the change data representing the updated one or more objects of the multiple objects.

11. The non-transitory computer-readable medium of claim 8, wherein the selection property panel indicates the one or more property values for the first type of property by descending order of frequency in the multiple objects present in the area.

12. The non-transitory computer-readable medium of claim 8, wherein the selection property panel indicates the one or more property values for the first type of property that are most frequently used amongst the multiple objects present in the area.

13. A method for operating a computing device comprising one or more processors, the method comprising:
providing workspace data describing a design interface and interactive graphic design system instructions to a user computing device, wherein the interactive graphic design system instructions, when executed at the user computing device, causes the user computing device to:
rendering a plurality of objects of the design interface on a canvas;
interpreting an action by a user selecting an area over a portion of the canvas;
identify multiple objects of the plurality of objects that are contained in the selected area, the multiple objects including at least a first objecting having one or more child objects;
determine, for each object of the multiple objects, a corresponding property value of a first type of property;
in response to the user selecting the area, displaying, as part of a selection property panel, multiple representations of property values of the first type of property, each representation of the multiple representations representing the corresponding property value of at least one object of the multiple objects;
wherein the selection property panel displays the multiple representations in accordance with an order that is based at least in part on usage amongst the multiple objects present in the selected area;
receiving user input through the selection property panel, the user input selecting a property value for the first type of property; and
updating one or more objects of the multiple objects present in the area to have the selected property value of the first type of property, without updating a corresponding property value of the first type of property of any other object of the plurality of objects.

14. The method of claim 13, further comprising:
receiving change data from the user computing device, the change data representing the updated one or more objects of the multiple objects; and
in response to receiving the change data, updating, in a workspace data store, workspace data corresponding to the design interface to reflect the change data.

15. The method of claim 14, further comprising:
providing the workspace data describing the design interface and the interactive graphic design system instructions to a second user computing device;
in response to receiving the change data from the user computing device, providing the change data to the second user computing device;
wherein the interactive graphic design system instructions, when executed at the second user computing device, cause the second user computing device to update the workspace data and a rendering of the design interface at the second user computing device, so as to render the updated one or more objects of the multiple objects on a canvas of the second user computing device.

16. The method of claim 13, further comprising:
receiving a notification of the user input specifying the selected property value at the user computing device;
in response to the notification, sending a message to one or more other user computing devices working with the design interface, wherein the message causes locking of the objects in the plurality of objects corresponding to the selected property value at the one or more other user computing devices.

17. The method of claim 13, wherein the selection property panel indicates the one or more property values for the first type of property by descending order of frequency in the, multiple objects present in the area.

18. The method of claim 13, wherein the selection property panel indicates the one or more property values for the first type of property that are most frequently used amongst the multiple objects present in the area.

\* \* \* \* \*